United States Patent
Dietz et al.

(10) Patent No.: US 7,535,571 B2
(45) Date of Patent: May 19, 2009

(54) OPTICAL FLUID LEVEL ENCODER

(75) Inventors: Paul H. Dietz, Hopkinton, MA (US);
William S. Yerazunis, Acton, MA (US);
David C. Reynolds, Scarborough, ME
(US); Jonathan Westhues, Cambridge,
MA (US); Darren L. Leigh, Somerville,
MA (US); Dirk Brinkman, Cambridge,
MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 180 days.

(21) Appl. No.: 11/493,197

(22) Filed: Jul. 26, 2006

(65) Prior Publication Data

US 2008/0023659 A1    Jan. 31, 2008

(51) Int. Cl.
*G01N 21/55* (2006.01)

(52) U.S. Cl. .................................... 356/445
(58) Field of Classification Search ................ 356/445;
73/290, 319; 250/227.11, 227.23
See application file for complete search history.

(56) References Cited

U.S. PATENT DOCUMENTS

| | | | | |
|---|---|---|---|---|
| 3,120,125 A * | 2/1964 | Vasel | ............................ | 73/293 |
| 3,995,168 A * | 11/1976 | Neuscheler et al. | .......... | 250/577 |
| 4,246,489 A * | 1/1981 | Yoshida et al. | ............... | 250/577 |
| 4,342,042 A * | 7/1982 | Cruz-Uribe et al. | ............ | 347/7 |
| 4,443,699 A * | 4/1984 | Keller | ..................... | 250/227.11 |
| 4,544,840 A * | 10/1985 | Keller | ..................... | 250/227.23 |
| 5,054,319 A * | 10/1991 | Fling | ............................ | 73/319 |
| 5,747,824 A | 5/1998 | Jung et al. | | |
| 5,747,826 A * | 5/1998 | Niigaki et al. | ................. | 257/10 |
| 5,852,946 A | 12/1998 | Cowger | | |
| 6,448,574 B1 * | 9/2002 | Chow | .......................... | 250/577 |
| 2004/0069205 A1 * | 4/2004 | Lee et al. | ..................... | 116/109 |
| 2007/0180903 A1 * | 8/2007 | Gao | ......................... | 73/290 V |

OTHER PUBLICATIONS

U.S. Appl. No. 10/955,485, filed Sep. 30, 2004, Holcomb et al.
U.S. Appl. No. 10/800,484, filed Mar. 15, 2004, Corven et al.
U.S. Appl. No. 10/267,965, filed Oct. 9, 2002, Lee et al.
U.S. Appl. No. 10/265,954, filed Oct. 7, 2002, Shi et al.

* cited by examiner

*Primary Examiner*—Gregory J Toatley, Jr.
*Assistant Examiner*—Isiaka O Akanbi
(74) *Attorney, Agent, or Firm*—Dirk Brinkman; Gene Vinokur (57) ABSTRACT

An apparatus measures a fluid level in a container. A light source emits a light beam. A light sensor can sense the light beam. An optical conduit is arranged in a container for holding fluid. The optical conduit is arranged between the light source and the light sensor along a path of the light beam, such that at least one part of the light beam passes through the optical conduit, and at least an other part of the light beam passes through the fluid when the container holds the fluid. The sensor senses the light beam when a level of the fluid coincides with the one part of the light beam passing through the optical conduit, and the sensor does not sense the light beam when the level of the fluid coincides with the other part of the light beam passing through the fluid due to internal reflection at the fluid level.

17 Claims, 9 Drawing Sheets

OPTICAL FLUID LEVEL ENCODER

FIELD OF THE INVENTION

The present invention generally relates to an apparatus for measuring fluid levels in a container, and more particularly, to measuring fluid levels optically.

BACKGROUND OF THE INVENTION

There are numerous applications where it is necessary to measure an amount of fuel in a container.

U.S. patent application Ser. No. 10/955,485, "Method and system for encoding fluid level" filed by Holcomb et al. on Sep. 30, 2004 and issued as U.S. Pat. No. 6,992,757, describe a float riding on the surface of a fluid. The float is mechanically coupled to a rotating encoder disk which is segmented with optically transparent and opaque regions. A set of light emitting diodes (LEDs) are aligned with photo sensors on the other side of the disk So that the fluid level can be encoded as the disk rotates as the float moves up and down.

U.S. patent application Ser. No. 10/800,484, "Optical fluid level monitor" filed by David Corven et al. on Mar. 15, 2004, describes an optical sensor that includes a display, a light pipe optically connected to the display and extending to a level of interest in the reservoir, where the light pipe is formed from a material having a refractive index higher than air's refractive index and less than or equal to the liquid's refractive index; and a light optically connected to the light pipe. The light pipe can be a glass or plastic rod, or a bundle of optical fibers.

U.S. patent application Ser. No. 10/267,965, "Fluid container with level indicator, and fluid level indicator assembly for a fluid container," filed by Lee et al. on Oct. 9, 2002, describes fluid level sensor that includes a visual display of a fluid level in a container using multiple capillary tubes terminating at different vertical levels from one another in the container.

U.S. patent application Ser. No. 10/265,954, "LCC-based fluid-level detection sensor" filed by Shi et al. on Oct. 7, 2002 and issued as U.S. Pat. No. 6,949,758, describes a fluid level sensor based on light communication channel (LCC) technology. One end of the LCC is connected to a signal source while another end is connected to a sensor. The LCC is dipped in a fluid container and a signal propagates and undergoes internal reflection through the LCC towards one of its ends which is connected to the sensor. The fluid level is detected by measuring an intensity of the signal reflected with the LCC that reaches a sensor.

U.S. Pat. No. 5,852,946, "Method and apparatus for detecting fluid level" issued Cowger on Dec. 29, 1998, describes a fluid level detector for providing a signal indicative of fluid level in a fluid container. The fluid level detector includes a first light conduit portion for providing light to fluid within the fluid container. A second light conduit portion is provided for receiving light provided by the first light conduit portion. Also included is a light path extending from the first light conduit portion to the second conduit portion. The light path has a light path length, which varies with an amount of fluid within the fluid container. The light path length variation produces light intensity variation at the second conduit portion which is indicative of fluid level in the fluid container.

U.S. Pat. No. 5,747,824, "Apparatus and method for sensing fluid level" issued to Jung et al. on May 5, 1998, describes an array of infrared LEDs and an array of photo sensors are positioned vertically in a cassette. A vertical line on which the LEDs are arranged is substantially parallel to a direction in which the fluid level is within the cassette. The LEDs are aimed upwardly at an angle of approximately 20 degrees from horizontal so the a beam of light does not penetrate the fluid/air interface.

The Jung system can be distinguished according to a number of characteristics. First, for each level to be measured that system requires a light source and sensor pair for each fluid level to be detected. Second, the system cannot detect how far below or above the fluid level is for a single source/sensor pair. Third, for accurate readings of multiple levels a baffle is required to block energy at various angles. For fluids that can scatter light, adjacent sensors need to be properly oriented.

SUMMARY OF THE INVENTION

The embodiments of the invention provide a fluid level sensor. Optical structures block transmission of light beam only when the fluid is within a certain level range. The structures can be serially stacked to construct encoder channels, which respond to fluid levels in multiple ranges. Multiple stacks can be combined to construct incremental, absolute, or any of a variety of standard encoder topologies.

DETAILED DESCRIPTION OF THE PREFERRED EMBODIMENT

The embodiments of our invention provide an optical fluid level encoder for measuring a level of fluid in a container.

Figure 1:
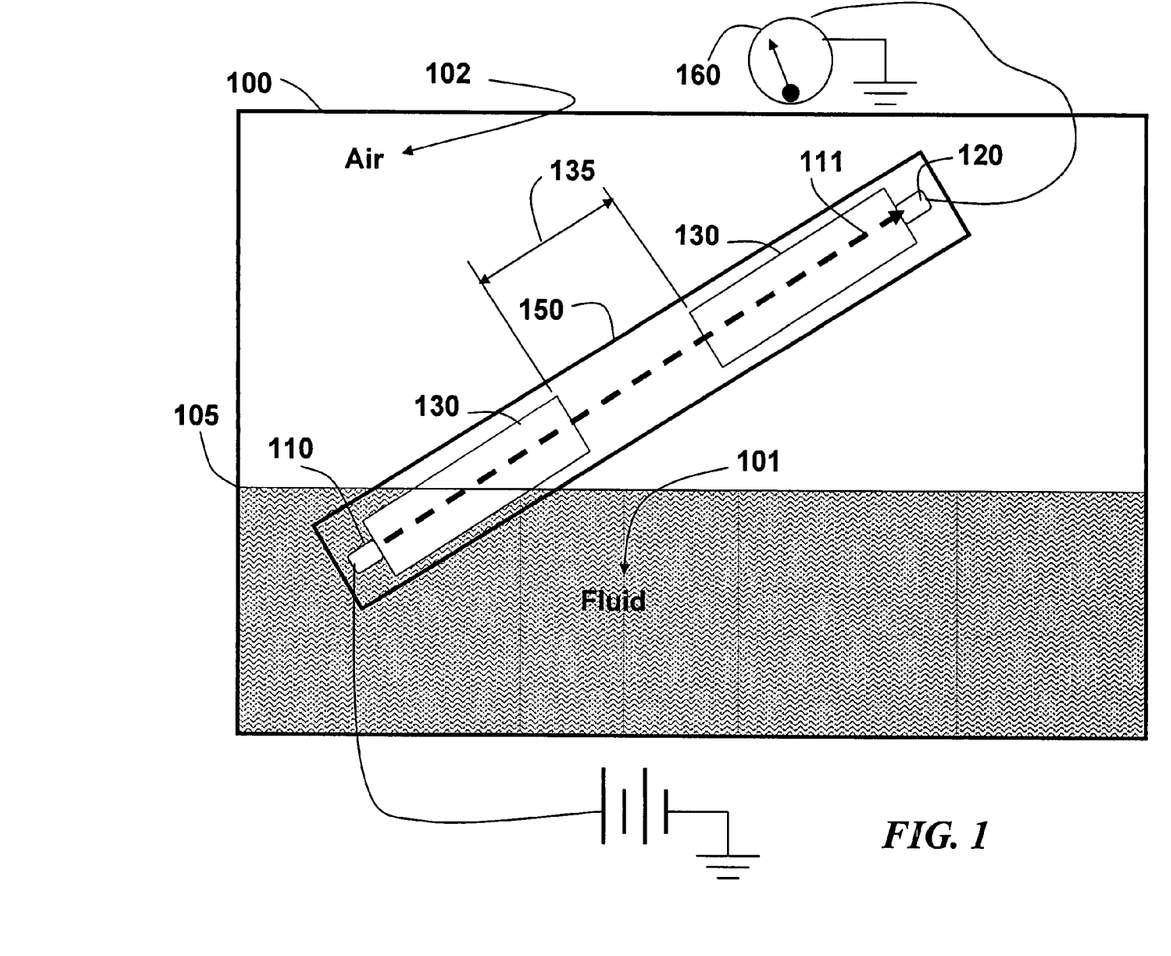
FIGS. 1-6 are block diagrams of light pipes for measuring fluid levels according to an embodiment of the invention.

FIG. 1 shows a structure of a basic "building block" component of our encoder. A container 100 is partially filled with a fluid 101 and air 102. A fluid level is 105.

A light pipe 150 is arranged at an angle in the container. The light pipe 150 includes a light source 110, e.g., a LED, a light sensor 120, e.g., a photo detector. It should be noted that the positions of the source and sensor can be reversed.

The light pipe also includes one or more optical conduits 130. In this embodiment, the two optical conduits are separated by a gap 135. A length of the optical conduits and gap(s) can be precisely controlled. In the preferred embodiment, the optical conduits are constructed of cylindrical transparent acrylic rods of different lengths. The diameter of the rods is about 5 mm.

Figure 9:
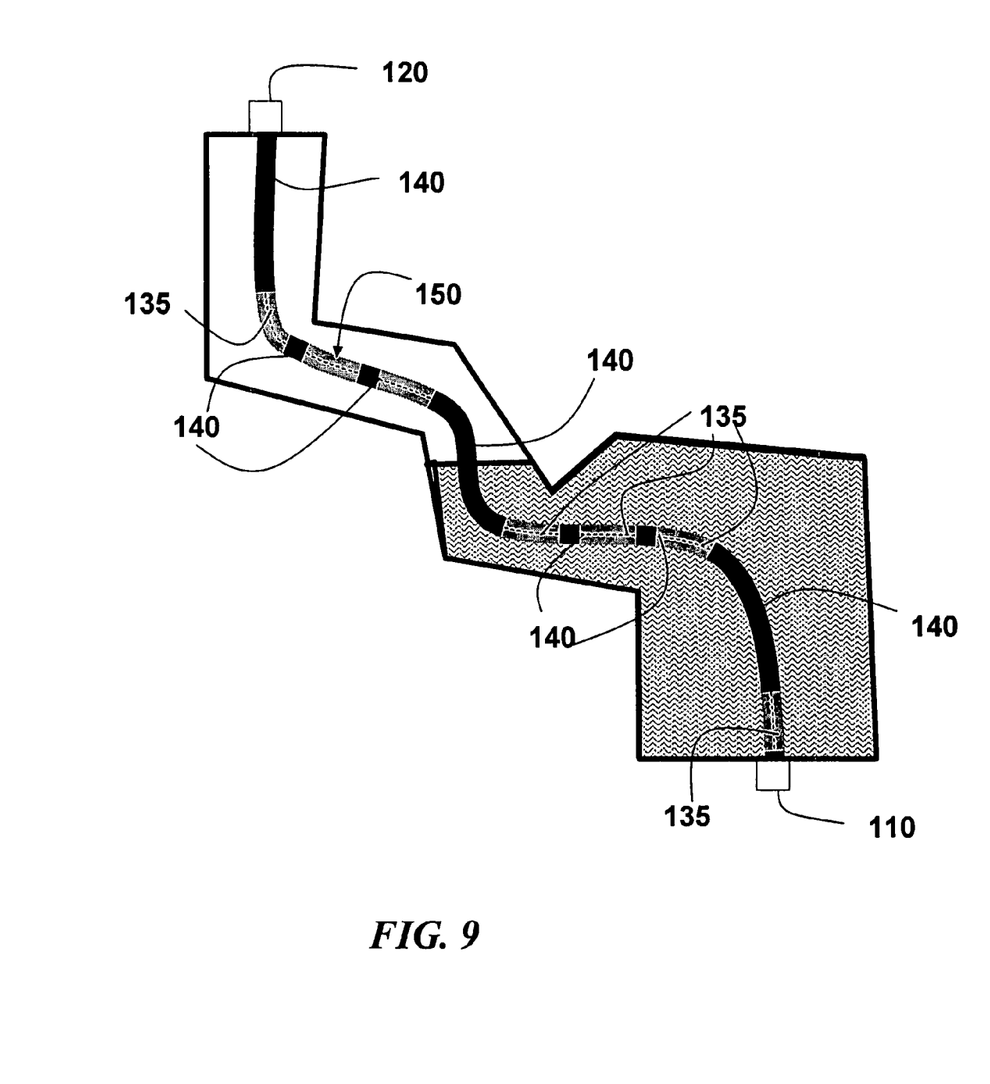
FIG. 9 is a side view of a light pipe for an irregularly shaped container.

In the preferred embodiment, the diameter of the rod is made the same as the diameter of the LED 110 and the phototransistor 120 to facilitate assembly of the encoder, see FIG. 9.

As an advantage, any light beam entering the conduits at one end exits the conduits at the opposite end due to total internal reflection. Total internal reflection occurs when light beam is refracted at the medium boundary of the conduit to effectively reflect all of the light back into the conduit. Therefore, the conduits can be curved, see FIG. 9.

Optional means 160 for indicating or measuring a light intensity is connected to the light sensor. The encoded output value can be "0" (off) or "1" (on), or some continuous value as described below. The artisan skilled in the art will recognize that the means 160 can be any measurement component, e.g., electrical, optical, and mechanical. It should also be noted that the sensor 120, can be passive, a translucent rod that is visible. In this case, the light beam will be visible in the sensor as long as the light beam penetrates the sensor.

The optical conduits is arranged between the light source and the light sensor along a path of the light beam, such that at least one part of the light beam passes through the optical conduit, and at least an other part of the light beam passes through the fluid when the container holds the fluid. It should be noted that the light beam can be any optical signal including visible light, infrared, ultraviolet, or in the form of a laser beam.

As shown in FIG. 1, the level of the fluid 101 is below the gap 135. Therefore, light beam 111 emitted by the source 110 is sensed, and it can be deduced that the fluid level range 105 is either below the gap 135 or above the gap 135, i.e., the container is almost empty or almost full.

Figure 2:
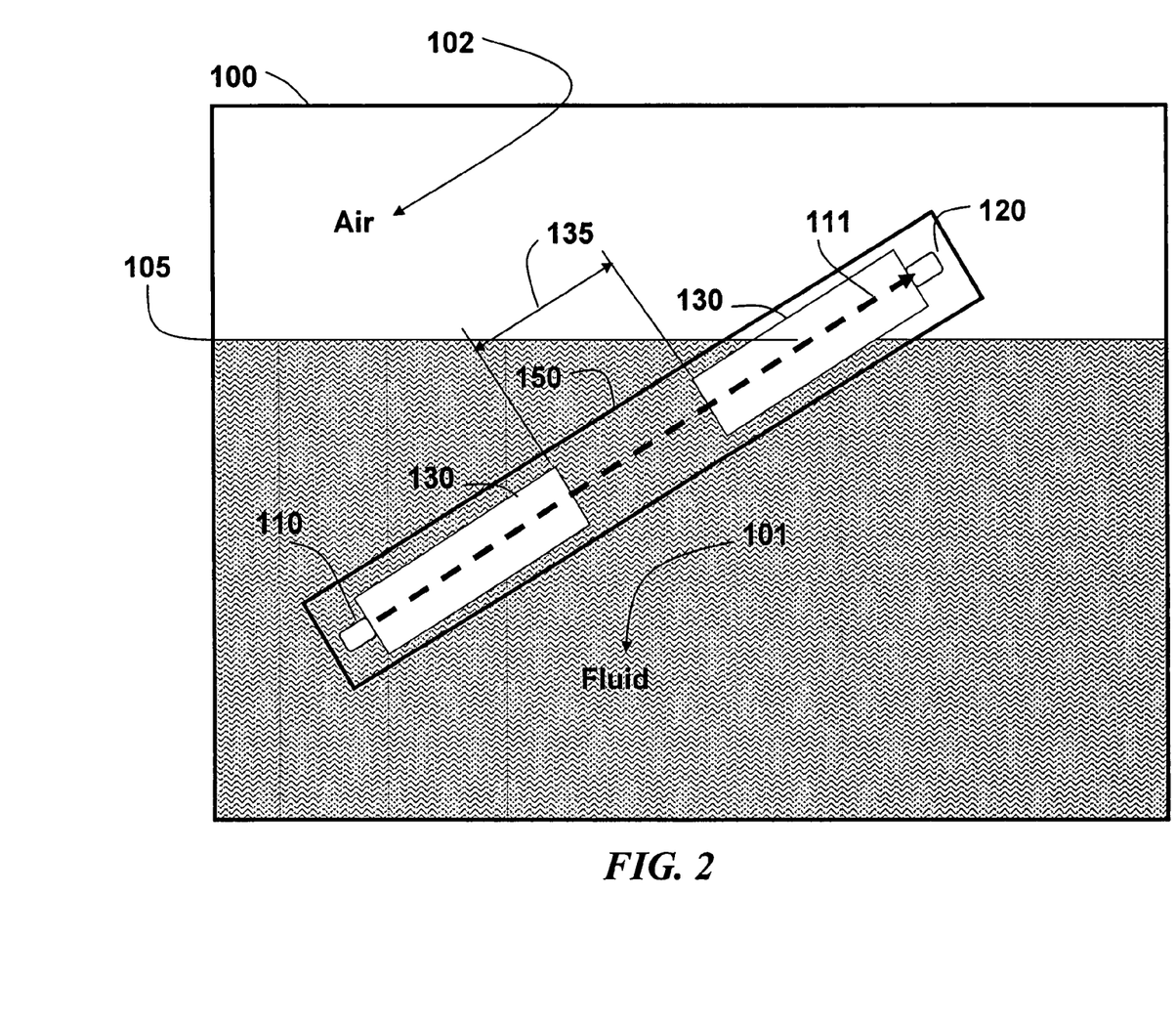

As shown in FIG. 2, the level of the fluid 101 is above the gap 135. Therefore, the light beam 111 emitted by the source 110 will be sensed, and it can be deduced that the fluid level range 105 is above the gap 135 or below the gap 135; again, the container is almost empty or almost full.

Figure 3:
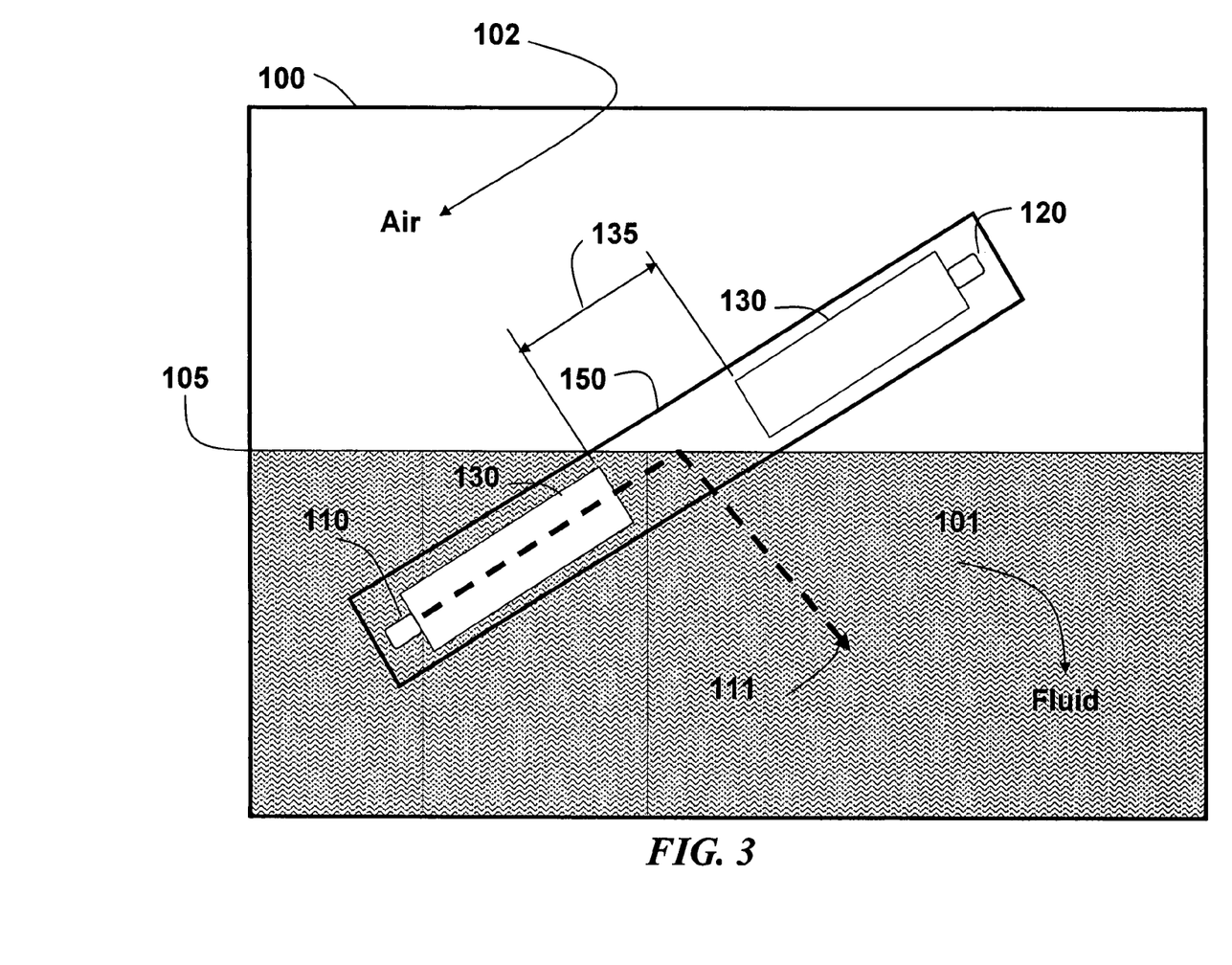

As shown in FIG. 3, the level of the fluid is in the gap. Therefore, the light is reflected at the fluid/air interface and no light is sensed, and it is possible that the fluid level range 105 is in the gap 135. For an air/water interface, the critical angle for internal reflection is 48.75° or greater.

By precisely cutting the lengths of the optical conduits, it is possible to construct a fluid level encoder that can maintain the fluid level over a small range of values, e.g., only the values where the fluid level is in the gap.

During operation, as the fluid level rises, the level indicator can be incremented each time a gap is reached, and as the fluid level falls, the level indicator can be decremented. Thus, the configuration shown in FIG. 3 can indicate three different ranges of levels of fluid.

Figure 4A:
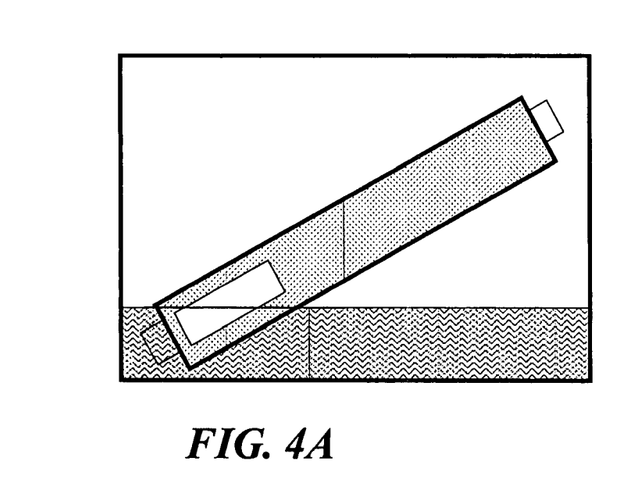
Figure 4B:
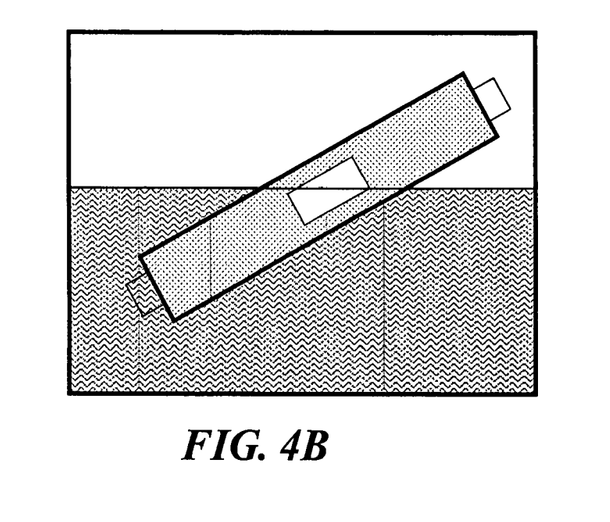
Figure 4C:
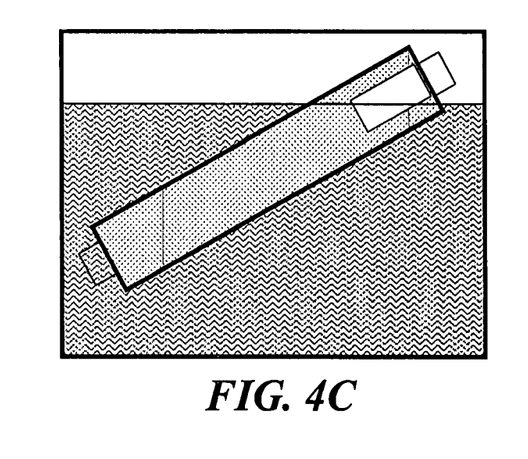

FIGS. 4A, 4B, and 4C show alternative arrangements with a single optical conduit. If the fluid level is in the range of the optical conduit, the output of the encoder is logical "1" or "on", and logical "0" or "off otherwise.

The fluid level encoder will always be on when the container is almost empty in FIG. 4A, half full for Figure B, and almost full for FIG. 4C.

Figure 5:
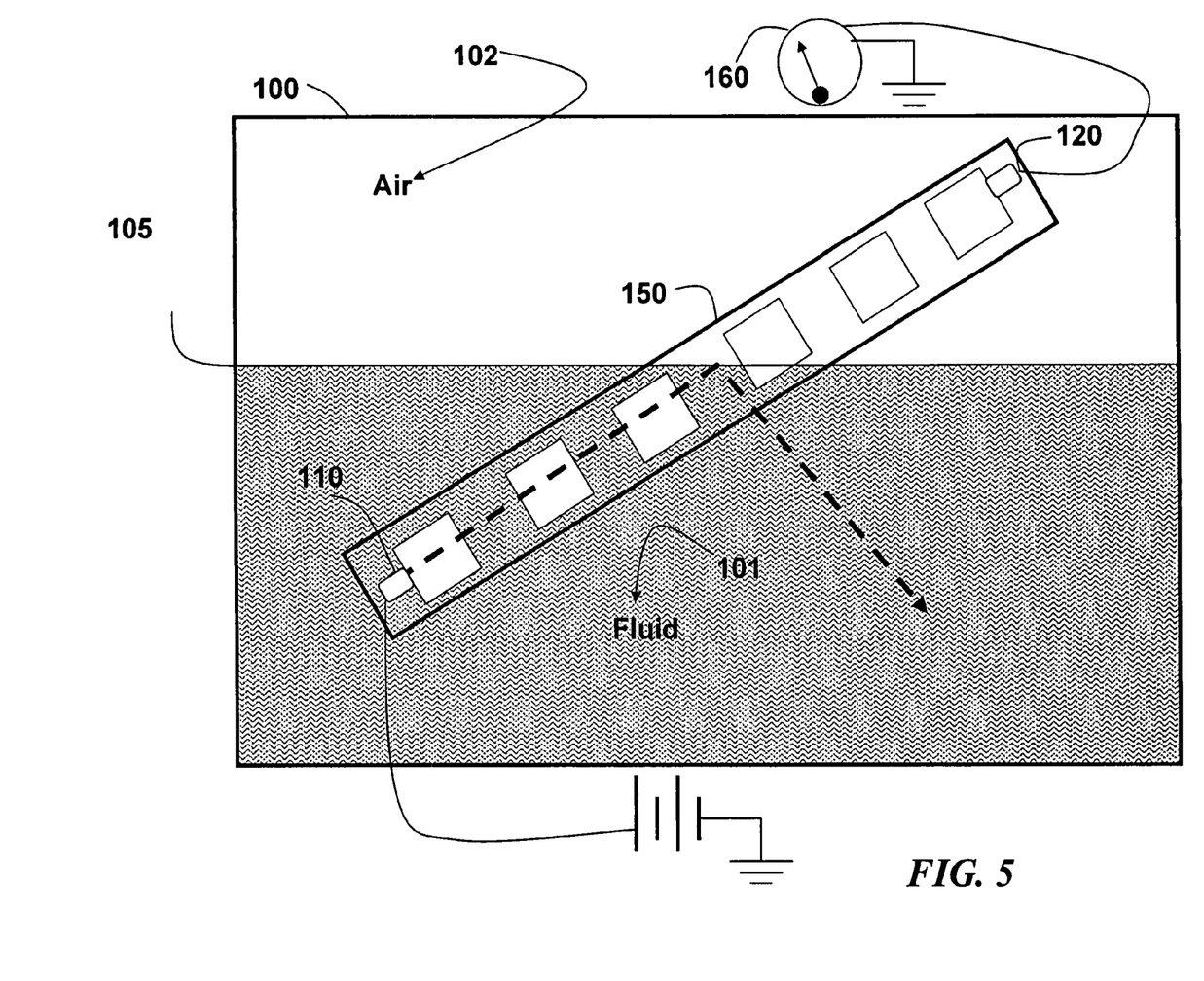

FIG. 5 shows an arrangement where the light pipe has multiple, e.g., six optical conduits, and five corresponding gaps to indicate eleven different fluid levels.

Stacked Light Pipes

Figure 6:
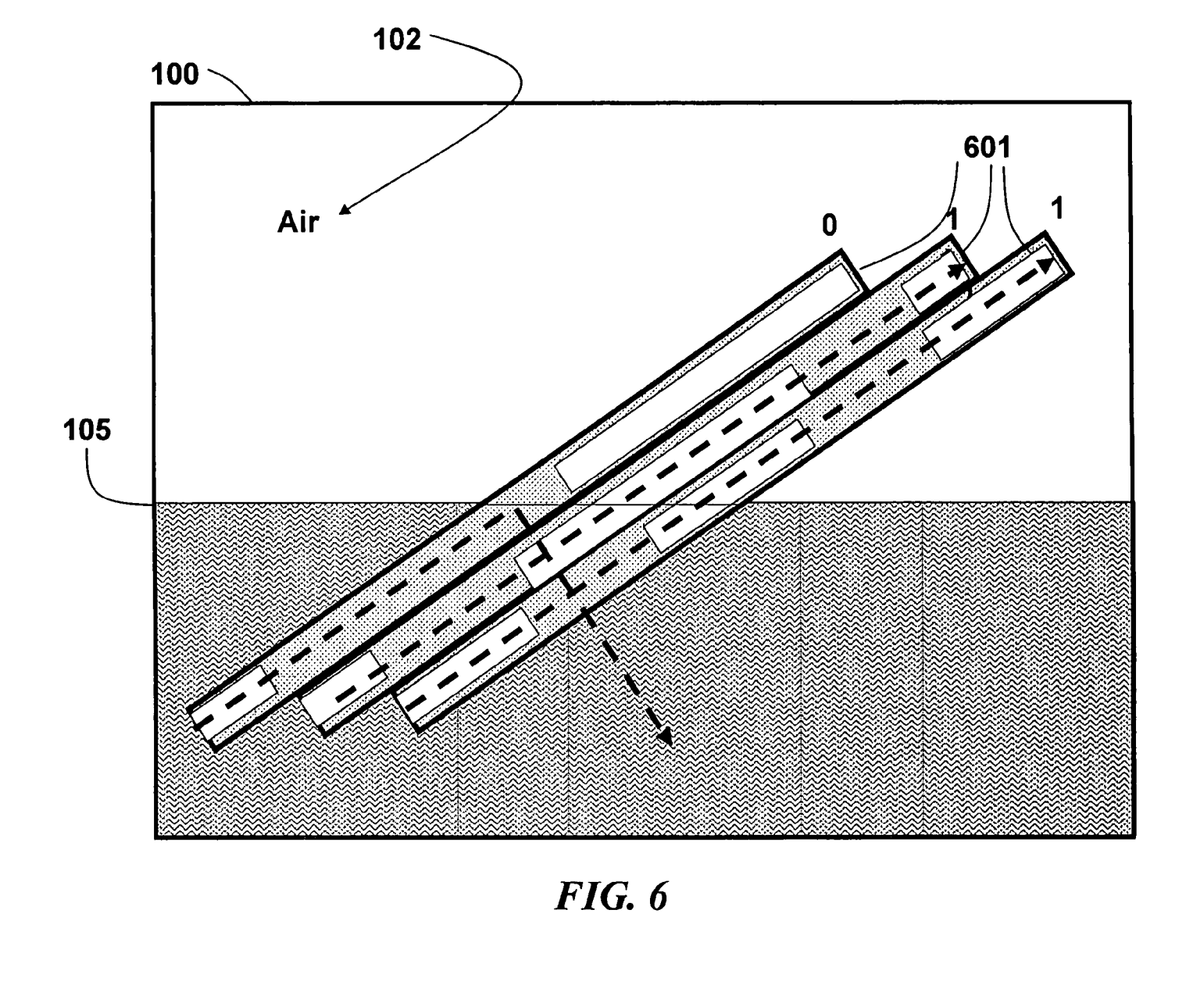

In another embodiment of the invention as shown in FIG. 6, multiple light pipes 601 are "stacked" adjacently in the container, with the optical conduits and gaps being of different lengths. Thus, it is possible to construct an optical fluid level encoder. There is no necessity of stacking in any particular direction, as long as the liquid-air interface 105 covers and uncovers the optical conduits ends in an order needed to generate the desired output sequence. In one preferred embodiment, this output sequence is a Gray code.

Gray Code

A Gray code provide an encoding of $2^n$ binary numbers such that only one bit changes from one value to the next. As an advantage, Gray codes are useful encoding fluid levels because a slight position change in the fluid level only affects one bit. In a conventional binary code, up to n bits can change as the fluid level rises or falls across a single dividing line, and a slight misalignments of the measuring device can cause extremely incorrect level readings.

For example, moving from level 7 to level 8, i.e., that is, 0111 to 1000 in binary, can result in any of the 16 possible results from 0000 to 1111 as an intermediate state, depending on the slightest misalignment in the individual detectors for a 0 and a 1 in each of the four channels. Because a Gray code changes only one bit at a time, the worst case error is a single count in either direction, and that error only exists for the maximum permitted assembly misalignment of the assembly during manufacture.

A binary-reflected Gray code for n bits can be constructed by taking a Gray code for n-1 bits, and repeating it in reverse order, then prepending a zero to all values in the first half of the new code and a 1 to all values in the second half of the new code.

---

For example, a 2-bit Gray code is:
    00    01    11    10.
Repeating the code again, in reverse order, yields:
    00  01  11  10  10  11  01  00.
Prepending a zero to each value in the first half yields:
    000   001   011   010   10  11  01  00.
and prepending a 1 to each value in the second half yields:
    000   001   011   010   110   111   101   100,
which is a valid three-bit Gray code. This process can be repeated indefinitely to yield Gray codes of any desired length and resolution.

Note that the above Gray code is not the only possible one; for example, rotations of a valid Gray code yield other valid Gray codes. In the above example, we can rotate the 2-bit code
    00   01   11   10
to
    01   00   10   11,
which yields the 3-bit code:
    001   000   010   011   111   110   100   101.

---

FIG. 6 shows an optical fluid level encoder with three light pipes for encoding according to the above described three-bit rotated Gray code. For the fluid level shown in FIG. 6, the Gray code is code 011.

It should be understood that other types of codes can also be encoded; the codes need not be absolute codes such as binary or Gray codes. Quadrature codes can be used, as can virtual absolute codes, where a quadrature code provides high resolution, and a third code line provides a unique sequencing signature. As the fluid level changes slightly, the state of the unique sequencing code line yields a unique sequence that can only occur in one position, thus giving an absolute level with only three channels of data.

Figure 8:
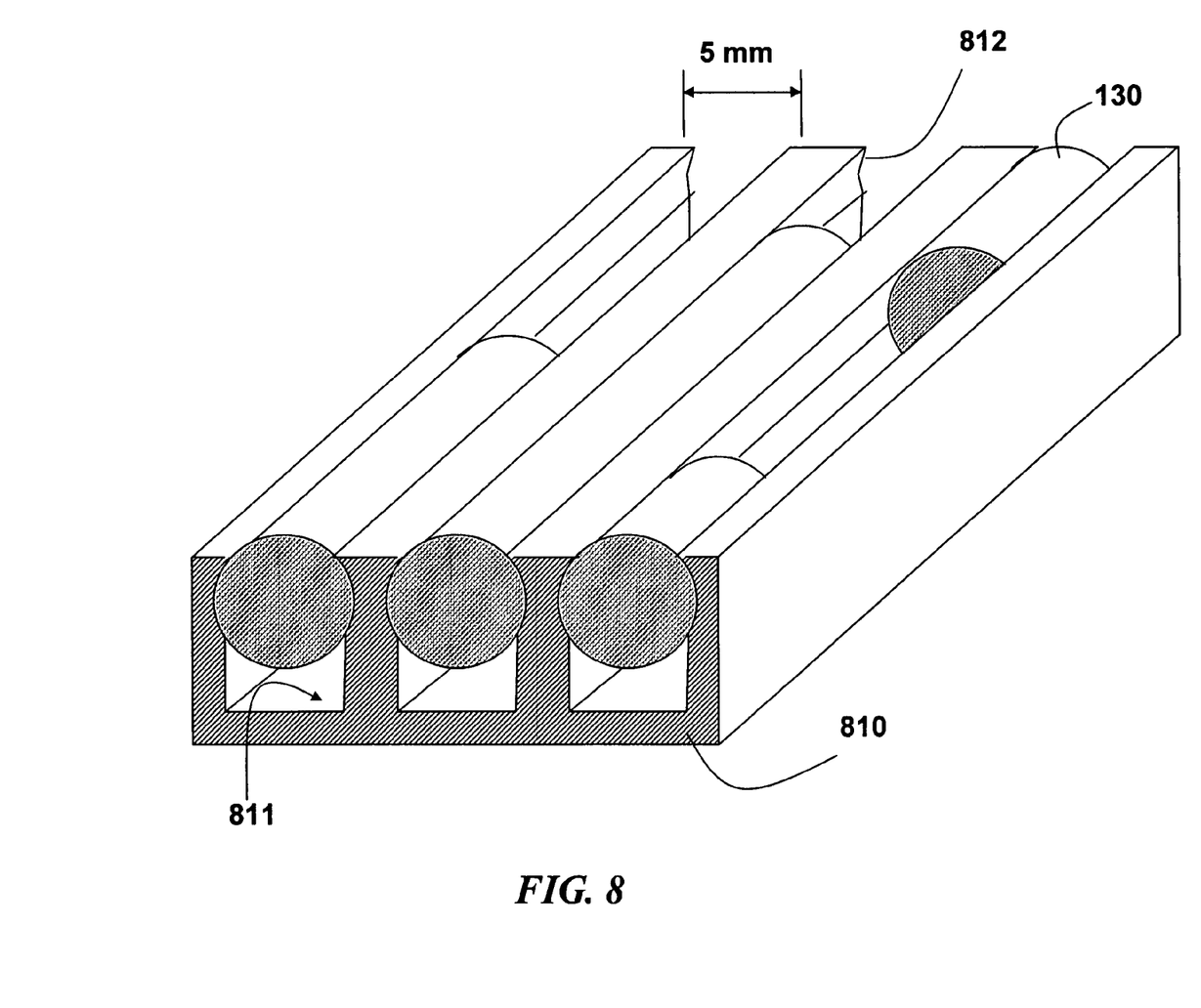
FIG. 8 is a perspective diagram of the light pipes of FIG. 6.

FIG. 8 shows how the light pipes can be stacked. A housing 810 is formed of, for example, plastic. The housing includes parallel channels 811. A part 812 of the channels is slightly rounded so that the optical conduits 130, light sources 110 and sensors 120 can be snapped into the channels.

Direct Digital Reading Fluid Level Device

Figure 7:
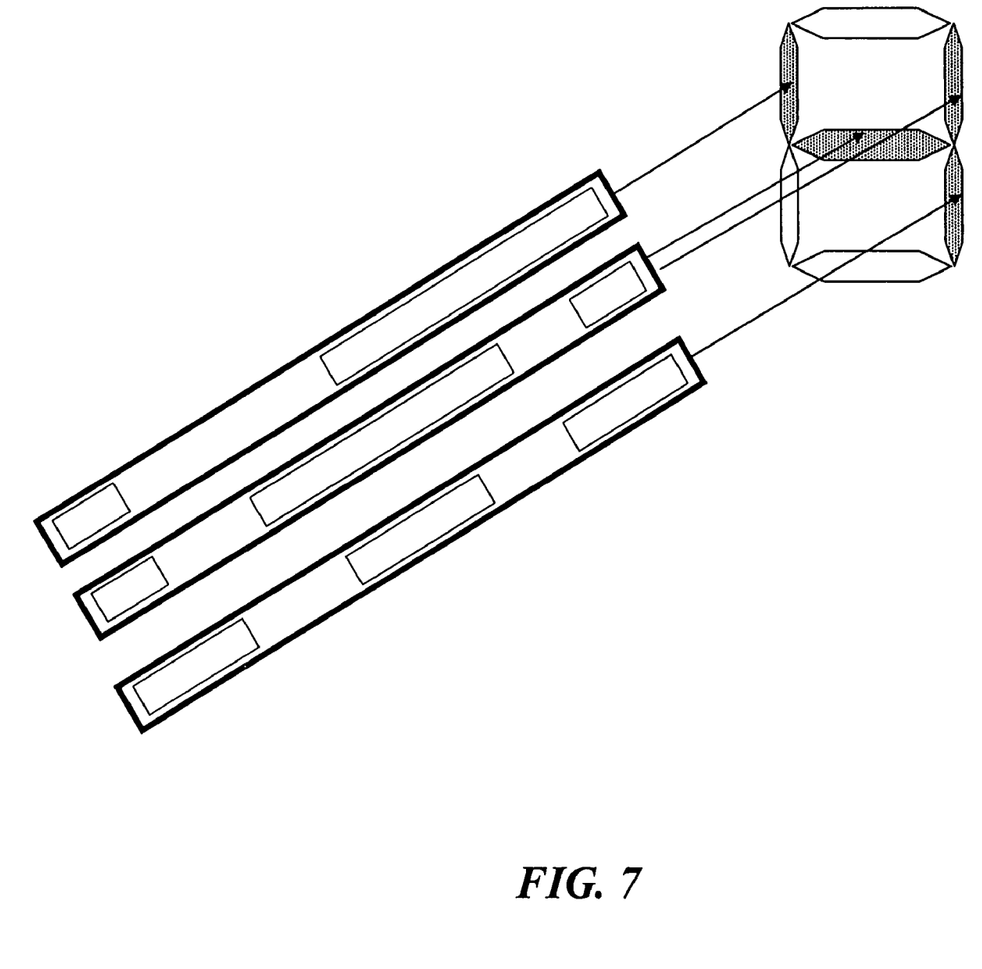
FIG. 7 is a block diagrams of a light pipe for measuring fluid levels according to an embodiment of the invention with a seven segment display.

Other embodiments are also possible as shown in FIG. 7. In one embodiment, the light pipes readout is entirely optical. FIG. 7 shows a conventional seven segment numerical display device is often used to indicate numeric digits, e.g., 4. To generate a numeric display of the fluid level, we determine which segments should be lit for which fluid level range, and then stacks appropriately arranged light pipes to generate this pattern. The light emerging light from each stack can then be optically directed to the appropriate segment of the display. This arrangement gives a numeric reading of the fluid level using only light. No moving parts or electronics circuits are required, other than the power to the light sources.

Irregularly Shaped Containers

As an advantage, the fluid level encoder as described herein can also be used with irregular shaped containers as shown in FIG. 9. With such containers, it is impossible to use conventional mechanical sensors such as floats, or optical sensors that require a direct line of sight from the light source to the sensor. Here, the conduits 140 "bend" the light from the source 110, around corners, to the sensor 120. Note, in portions of the light pipe where the fluid level does not change much, the number of conduits can be sparse.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An apparatus for measuring a fluid level in a container, comprising:
    a light source configured to emit a light beam;
    a light sensor configured to sense the light beam; and
    an optical conduit arranged in a container for holding fluid, the optical conduit arranged between the light source and the light sensor along a path of the light beam, such that at least one part of the light beam passes through the optical conduit, and at least an other part of the light beam passes through the fluid when the container holds the fluid, and in which the other part of the light beam is at an angle with respect to a fluid level to cause the light beam to be reflected internally at the fluid level, and in which the angle is greater than the critical angle for internal reflection.

2. The apparatus of claim 1, in which the optical conduit is a cylindrical transparent acrylic rod.

3. The apparatus of claim 1, in which diameters of the optical conduit, light source and light sensor are substantially the same.

4. The apparatus of claim 1, in which the light source is a light emitting diode and the light sensor is a photo transistor.

5. The apparatus of claim 1, in which the light conduit is straight.

6. The apparatus of claim 1, in which the light conduit is partially curved.

7. The apparatus of claim 1, in which a plurality of conduits are placed in the path of the light beam such that there are a plurality of gaps between the plurality of conduits.

8. The apparatus of claim 7, in which lengths of the conduits and lengths of the gaps are different.

9. The apparatus of claim 7, in which a shape of the container is irregular, and the plurality of conduits direct the light beam in a curved path from the light source to the light sensor.

10. The apparatus of claim 1, in which the light source and the light sensor and one or more optical conduits in the path of the light beam form a light pipe, and further comprising:
    a plurality of light pipes stacked parallel to each other in the container.

11. The apparatus of the claim 10, in which a number of conduits and lengths of the conduits of the plurality of light pipes encode fluid levels as a Gray code.

12. The apparatus of claim 10, in which the light sensors are in a form of elements of a seven segment numerical display device.

13. The apparatus of claim 1, in which the light sensor senses the light beam when a level of the fluid coincides with the one part of the light beam passing through the optical conduit, and the sensor does not sense the light beam when the level of the fluid coincides with the other part of the light beam passing through the fluid.

14. The apparatus of claim 1, in which the light source 110 is in the fluid.

15. The apparatus if claim 1, in which the light beam is refracted at the fluid level.

16. An apparatus for measuring a fluid level in a container, comprising:
    a light source configured to emit a light beam;
    a light sensor configured to sense the light beam; and
    an optical conduit arranged in a container for holding fluid, the optical conduit arranged between the light source and the light sensor along a path of the light beam, such that at least one part of the light beam passes through the optical conduit, and at least an other part of the light beam passes through the fluid when the container holds the fluid, and in which the light sensor only senses the light beam when a level of the fluid coincides with the one part of the light beam passing through the optical conduit, and in which the other part of the light beam is at an angle with respect to a fluid level to cause the light beam to be reflected internally at the fluid level, and in which the angle is greater than the critical angle for internal reflection.

17. A method for measuring a fluid level in a container, comprising:
    emitting a light beam from a light source;
    passing at least one part of the light beam through an optical conduit placed in a container for holding fluid;
    passing at least an other part of the light beam through the fluid when the container holds the fluid; and
    sensing the light beam only when a level of the fluid coincides with the one part of the light beam passing through the optical conduit, and in which the other part of the light beam is at an angle with respect to a fluid level to cause the light beam to be reflected internally at the fluid level, and in which the angle is greater than the critical angle for internal reflection.

* * * * *